Nov. 24, 1953  G. D. FRIEDEL  2,660,289
FEEDER
Filed Nov. 21, 1949  2 Sheets-Sheet 1
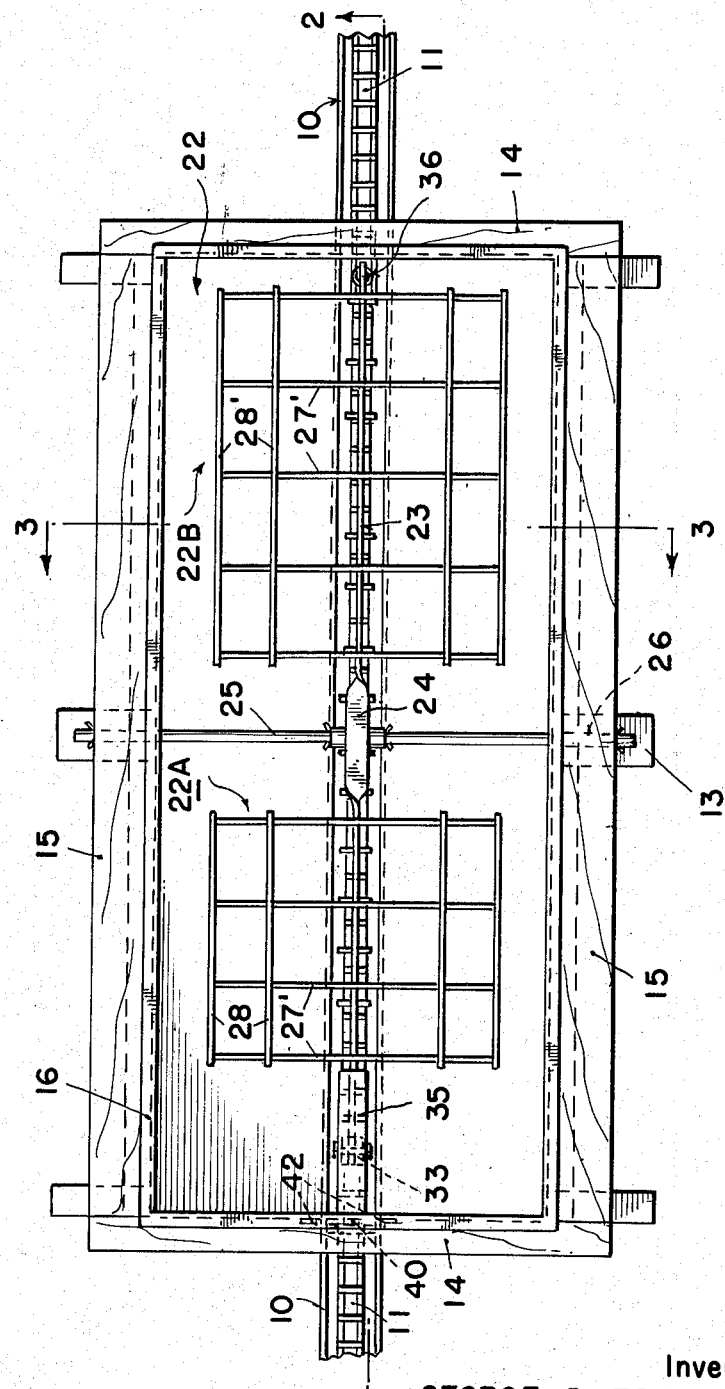
FIG. I
Inventor:
GEORGE D. FRIEDEL,
By *Wm. L. Edmiston*
Attorney Nov. 24, 1953 — G. D. FRIEDEL — 2,660,289
FEEDER
Filed Nov. 21, 1949 — 2 Sheets-Sheet 2
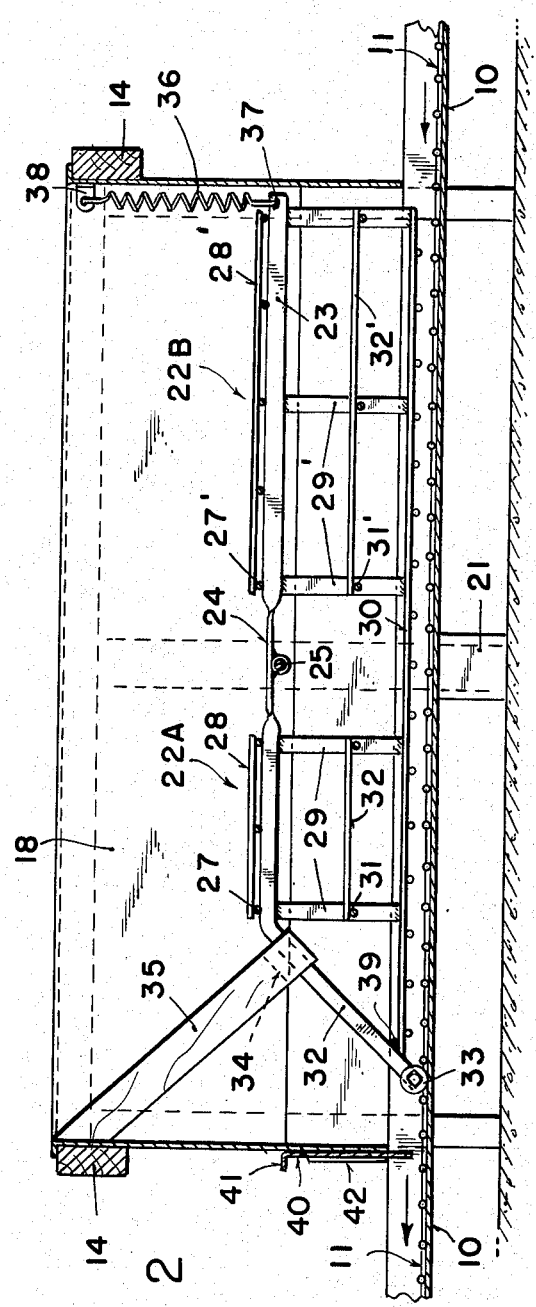
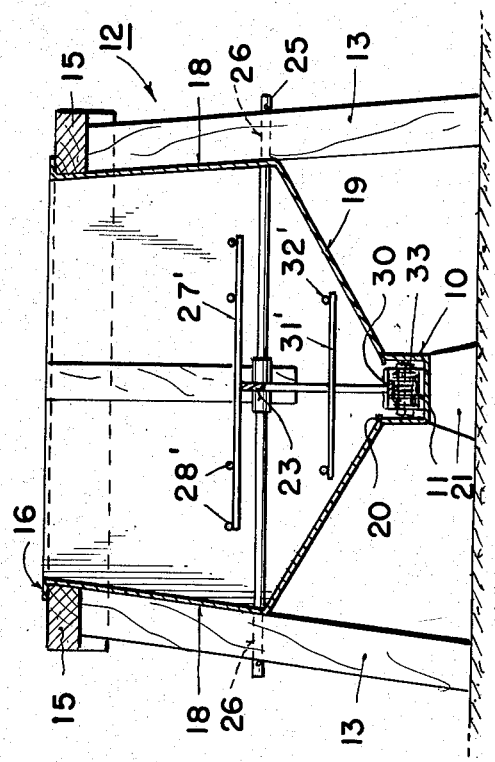
Inventor:
GEORGE D. FRIEDEL,
By *Wm. L. Edmonston*
Attorney Patented Nov. 24, 1953

2,660,289

UNITED STATES PATENT OFFICE 2,660,289

FEEDER

George D. Friedel, Seaford, Del.

Application November 21, 1949, Serial No. 128,653

5 Claims. (Cl. 198—59)

The present invention relates to feeders, more particularly to means for moving animal food automatically from a source of supply to strategically located feeding stations. It has reference to an "auxiliary supply source" adapted to be employed with the so called "power driven feeder" whereby a constant, uniform flow of food to the stations is assured even though the main or primary source of food is exhausted.

It has always been a serious problem on poultry farms, especially on farms raising large numbers of chickens and other fowls, to provide adequate feeding, although in recent years, this problem has been alleviated by the introduction of various types of automatic feeders. Perhaps the most widely used automatic feeder has been the power driven chain assembly, and in brief this unit includes a suitably located trough arrangement in which a chain belt is mounted, a power source, a drive connection between the belt and the power source and a supply hopper or storage bin so disposed as to admit the feed into the trough whereby the movement of the belt will carry the feed through the trough to feeding stations. While this apparatus is satisfactory, experience has demonstrated that the capacity of the system is somewhat limited thus necessitating a constant inspection of the supply hopper to determine its contents and because of the rather limited size of the hopper, it frequently requires refilling which is most objectionable. In addition, the fowl feeding at trough locations remote from the supply hopper tend to get less feed than those eating near the hopper.

Accordingly an important object of the invention is to provide an apparatus of the character described which will overcome the above and other disadvantageous characteristics currently present in the art.

Another object of my invention is to provide an auxiliary feeder for use with power driven chain feeders for poultry houses and the like wherein the movement of the chain is utilised to actuate an agitating assembly within the auxiliary feeder to prevent the contents from clogging the discharge outlet and insure an even feed.

A further object of the invention is to provide a feed hopper for employment with power driven chain belt poultry feeders which is simple in structural detail, positive and efficient in operation and capable of being readily and cheaply manufactured.

To achieve the above and other objects, the invention broadly comprises a hopper or bin of the desired capacity which is so located with respect to the trough that the discharge outlet of the hopper will be above the trough, an agitating unit pivotally mounted within the hopper, an actuating arm connected to the agitating unit and having its free end in contact with the chain belt and resilient means operatively attached to the agitating unit to maintain the free end of the arm against the belt whereby movement of the belt will impart a slight vertical displacement of the arm to move the agitating unit about its pivot thereby preventing clogging of the feed and assisting its flow toward the discharge outlet for deposit into the trough.

Other and additional objects of the invention will become apparent from the following description and attached drawings which form part of the application.

Reference will be had to the accompanying drawings depicting a preferred embodiment of the inventive concept wherein like numerals denote the same or similar parts and in which:

Figure 1 is a plan view of the apparatus, a fragment of the trough and associated chain belt being illustrated.

Figure 2 is a vertical sectional view taken along the line 2—2 of Figure 1, the view being taken in the direction of the arrows.

Figure 3 is a vertical sectional view taken along the line 3—3 of Figure 1, the view being taken in the direction of the arrows.

With reference to the drawings, and particularly Figure 2, I have indicated a portion of a feed trough 10 having a feed device such as a chain belt 11 movable therein and my novel auxiliary hopper designated generally 12. The trough 10 may be of any desired length and configuration and may be located either interiorly or exteriorly of the chicken house and the belt 11 is operatively connected with a suitable power source, usually disposed in the feed room. A storage bin (not shown) is also situated in the feed room above the trough to supply the feed to the belt for movement through the trough.

The hopper 12 includes aligned pairs of spaced legs or standards 13, the legs being positioned on opposite sides of the trough and preferably converging toward the upper ends to afford a more stable structure. Transversely and longitudinally extending members 14 and 15 are conveniently secured to the upper ends of the legs 13 and horizontal flange 16 of a hopper 17 is supported by the members 14 and 15. If necessary, the flange 16 may be attached to members 14 and 15 by bolts or the like.

The hopper 17 has side walls 18 which may follow the contour of the inner faces of the legs 13 and merge with a tapered or inclined bottom wall 19 and the bottom wall is formed with a longitudinally disposed discharge outlet 20 located immediately above the belt 11 in the trough 10. A support 21 is preferably positioned beneath the trough to maintain the trough and outlet 20 in the proper relationship and to prevent sagging of the trough.

An agitator unit denoted 28 is mounted within the hopper 17 and includes a front section 22A and a rear section 22B. The sections 22A and 22B may be supported by a strap 23 which is twisted at its midpoint to provide a horizontal surface 24 which may be welded or otherwise affixed to a transversely extending rod 25, each end of which may be journalled in the side walls of the hopper and/or in the middle pair of legs 13 as shown at 26 so that the agitator may have a limited pivotal movement about the horizontal axis.

The section 22A consists of a plurality of parallel laterally extending rods 27 affixed to the strap 23 and reinforced by parallel rods 28 secured to the rods 27 at the desired intervals, the rods 28 being at right angles to the rods 27. Vertical elements 29 preferably depend from the strap 23 and are attached at their lower ends to a horizontal support 30 of somewhat greater length than the strap 23. A plurality of lateral and longitudinally extending rods 31 and 32 are carried by the forward elements 29 intermediate the ends thereof and as indicated in Figure 3, the lateral rods 31 are of lesser length than the rods 27 due to the fact that the rods 31 are located adjacent the tapered wall 19.

The rear section 22B is constructed in a similar manner to the front section 22A other than the fact that the longitudinally extending rods are of greater length and hence the same reference characters are employed with the exception that they are primed.

The forward end of the strap 23 is provided with an angular arm 32' which may be integrally formed therewith and which is of such length as to extend into the trough 10. The free end of the arm 32 supports a roller or other rotatable surface 33 which is adapted to engage the chain belt 11. The arm 32 projects through a slot 34 in an angular brace 35 supported by the forward end wall of the hopper 17 and the slot is of such depth as to permit the arm to have a limited movement therein. In order to maintain the roller 33 in contact with the chain belt 11 it will be noted in Figure 2 that a helical spring 36 is anchored at one end to the rear end of the strap 23, as indicated at 37, and at its opposite end to an ear or lug 38 suitably attached to the end wall of the hopper 17 in proximity to the upper end thereof. As previously indicated, the support 30 is of greater length than the strap 23 in order that the forward end may be spot welded or otherwise secured to the arm 32 at a point above the roller 33, as indicated at 39. Consequently, the sections 22A, 22B, strap 23, support 30 and the arm 32 provide in effect a unitary structure which is quite sturdy and is not subject to being easily damaged. The hopper might have a slide gate 40 with handle 41 and movable in suitable guideways 42 to regulate the feed from the hopper.

While the operation of the auxiliary feeding hopper is thought to be readily apparent from the above description, it may be briefly summarized as follows:

The hopper 12 is disposed at the desired location above the trough 10 and, of course, is filled with feed such as mash, grain, pellets, and the like. Upon activation of the power source, movement is imparted to the chain belt 11 and as the transverse bars of the belt pass beneath the arm 32 the roller 33 will alternately rise and fall which in turn will rock the agitator unit 22 about its pivot and the movement of the sections 22A and 22B will maintain a free and uniform flow of the feed through the discharge outlet 20 upon the belt 11 and at the same time tend to prevent the feed from clogging within the hopper. The foregoing cycle will, of course, continue so long as the power source is operating and upon inactivation of the power source, the spring 36 will hold the roller 33 in engagement with the chain.

It is also possible to provide the legs 13 with casters in order that the unit may be readily moved in the event it is desired to change the location of the auxiliary hopper along the trough 10.

It will be appreciated from the foregoing description that I have provided a feed hopper which may be employed with conventional automatic chain feeders for poultry houses for assuring an adequate movement of feed in the troughs to enable the fowl to receive the same amount of feed throughout the length of the trough. Furthermore, the agitating assembly, by having its actuating member operated by the movement of the belt, will effect a uniform flow of the feed into the trough. The feeder includes relatively few essential working parts and may be easily and inexpensively fabricated. By virtue of its automatic operation labor costs are held to a minimum which is most desirable.

While I have shown and described but a single embodiment of my concept, it is to be considered as illustrative and the scope of the invention is to be defined in the light of the annexed claims.

What I claim is:

1. A hopper for poultry feeds adapted to be located above a feed trough comprising a power driven chain belt movable in the trough, a longitudinally extending member pivotally mounted within the hopper for movement about a horizontal axis, agitating elements supported by the longitudinally extending member, an actuating arm carried by the longitudinally extending member and having its free end forwardly of the longitudinally extending member and in contact with the chain belt, and resilient means operatively connected to the longitudinally extending member and the hopper to maintain the free end of the arm against the belt whereby movement of the belt will alternately raise and lower the arm to rock the longitudinally extending member about its pivot so that the agitating elements will effect a free flow of the feed into the trough.

2. A hopper as claimed in claim 1 wherein at least certain of the agitating elements depend from the longitudinally extending member to a point in proximity to the trough.

3. A supply hopper for depositing poultry feed into a trough disposed below the outlet of the hopper comprising a chain belt movable in the trough, a horizontal shaft extending transversely of the hopper and journalled in the walls of the hopper, a support extending longitudinally of the hopper and secured to said shaft, and agitating unit carried by said support intermediate each end of the support and the shaft, an actuating arm extending downwardly from one end of the support forwardly of the agitating unit, a roller on the free end of the arm in contact with the chain belt, and spring means connected to the opposite end of the support and to the hopper to maintain the roller against the belt whereby movement of the belt will alternately raise and lower the arm to rock the support so that the agitating units will effect a free flow of the feed through the hopper outlet into the trough.

4. A hopper for poultry feeds adapted to be located above a feed trough having a driven chain belt movable therein comprising a support member within the hopper arranged in substantial parallelism to the driven chain belt, means pivotally mounting the support member within the hopper for movement toward and away from the driven chain belt, an agitating assembly carried by said support member, an actuating arm secured to the support member and having its free end terminating adjacent the chain belt, rotary means carried by the free end of the arm and operatively engaging the chain belt whereby movement of the belt will alternately raise and lower the arm to rock the support member about its pivot to effect a free flow of the feed into the trough.

5. A hopper as defined in and claimed by claim 4 further characterized in that spring means is secured to the support member and to the hopper to maintain the rotary means in engagement with the chain belt.

GEORGE D. FRIEDEL.

References Cited in the file of this patent

UNITED STATES PATENTS

| Number | Name | Date |
|---|---|---|
| 426,245 | Craig | Apr. 22, 1890 |
| 976,483 | Mitchell | Nov. 22, 1910 |
| 1,537,123 | Leopold | May 12, 1925 |
| 1,783,092 | Lewis | Nov. 25, 1930 |
| 1,996,044 | Green | Mar. 26, 1935 |
| 2,286,143 | Lee | June 9, 1942 |
| 2,563,321 | Dugan | Aug. 7, 1951 |

FOREIGN PATENTS

| Number | Country | Date |
|---|---|---|
| 710,757 | France | Aug. 28, 1931 |